United States Patent
Castro et al.

(10) Patent No.: US 10,248,389 B2
(45) Date of Patent: Apr. 2, 2019

(54) GRAPHICAL USER INTERFACE EDITOR SYSTEM AND METHOD FOR PERSONAL DEVICES

(71) Applicant: SUUNTO OY, Vantaa (FI)

(72) Inventors: Brenda Castro, Vantaa (FI); Toni Leskela, Vantaa (FI); Erik Lindman, Vantaa (FI)

(73) Assignee: Amer Sports Digital Services Oy, Vantaa (FI)

( * ) Notice: Subject to any disclaimer, the term of this patent is extended or adjusted under 35 U.S.C. 154(b) by 946 days.

(21) Appl. No.: 13/833,054

(22) Filed: Mar. 15, 2013

(65) Prior Publication Data

US 2014/0282131 A1    Sep. 18, 2014

(30) Foreign Application Priority Data

Mar. 15, 2013 (FI) .................................... 20135255

(51) Int. Cl.
*G06F 8/34* (2018.01)
*G06F 8/38* (2018.01)

(52) U.S. Cl.
CPC . *G06F 8/34* (2013.01); *G06F 8/38* (2013.01)

(58) Field of Classification Search
CPC ............ A63B 24/0062; A63B 2225/20; A63B 24/0075
USPC ......................... 715/765, 810, 744, 864, 747
See application file for complete search history.

(56) References Cited

U.S. PATENT DOCUMENTS

| | | | |
|---|---|---|---|
| 5,148,376 A * | 9/1992 | Sato ................................ | 702/50 |
| 5,555,369 A | 9/1996 | Menendez et al. | |
| 5,838,317 A * | 11/1998 | Bolnick ................ | G06F 3/0481 715/764 |
| 5,845,235 A | 12/1998 | Luukkanen et al. | |
| 5,899,204 A | 5/1999 | Cochran | |
| 6,188,407 B1 * | 2/2001 | Smith .................... | A61B 5/044 715/841 |
| 6,556,222 B1 | 4/2003 | Narayanaswami | |
| 7,310,549 B1 * | 12/2007 | Angelini ................. | B63C 11/02 482/3 |
| 7,751,285 B1 * | 7/2010 | Cain .................... | G04G 9/0017 368/10 |

(Continued)

FOREIGN PATENT DOCUMENTS

| | | |
|---|---|---|
| CH | 698848 | 11/2000 |
| EP | 1867565 A2 | 12/2007 |

(Continued)

*Primary Examiner* — Omar R Abdul-Ali
(74) *Attorney, Agent, or Firm* — Seppo Laine Oy

(57) ABSTRACT

This invention relates to an editor system for graphical user interfaces used in personal devices, and to a method for enabling a user to selectively display data and edit parameters on the user interface, and to a personal device, like a wristop or a diving computer. In order to edit the graphical user interface having at least one display view, where each set of data fields are arranged in a predetermined manner on the display view, the inventive editor system provides user access to a data field out of a set of data fields to allow user selection of parameters in this field. A list of parameter options valid for said field is displayed for selection by the user, the parameter value of which is to be displayed in said field.

10 Claims, 6 Drawing Sheets

(56) References Cited

U.S. PATENT DOCUMENTS

| | | | |
|---|---|---|---|
| 8,949,461 B2* | 2/2015 | Steele | H04L 29/06 709/246 |
| 2002/0033848 A1* | 3/2002 | Sciammarella | G06F 3/0481 715/838 |
| 2005/0004711 A1* | 1/2005 | Hirose | 700/265 |
| 2005/0024341 A1* | 2/2005 | Gillespie | G06F 1/1616 345/173 |
| 2007/0162254 A1* | 7/2007 | Hirose | 702/166 |
| 2007/0283953 A1* | 12/2007 | Angelini | B63C 11/02 128/201.27 |
| 2010/0083129 A1* | 4/2010 | Mishra | G06F 8/38 715/744 |
| 2010/0099539 A1* | 4/2010 | Haataja | 482/8 |
| 2010/0250208 A1 | 9/2010 | Leskela et al. | |
| 2012/0212505 A1* | 8/2012 | Burroughs et al. | 345/629 |
| 2012/0324390 A1 | 12/2012 | Tao | |
| 2013/0002533 A1* | 1/2013 | Burroughs | G06F 19/3481 345/156 |
| 2014/0240243 A1* | 8/2014 | Perala et al. | 345/173 |

FOREIGN PATENT DOCUMENTS

| | | |
|---|---|---|
| GB | 2431522 B | 1/2010 |
| JP | 2002108634 A | 4/2002 |
| WO | WO 02067449 A2 | 8/2002 |

* cited by examiner

GRAPHICAL USER INTERFACE EDITOR SYSTEM AND METHOD FOR PERSONAL DEVICES

This invention relates to an editor system for graphical user interfaces used in personal devices, and to a method for enabling a user to selectively display data and edit parameters on the user interface, and to a personal device, like a wristop or diving computer.

FIELD OF THE INVENTION

The present invention relates to user interfaces for electronic devices, such as devices intended for personal use in sports, outdoor activities and diving. The user interface is particularly well-suited and designed for a wristop computer, such as a diving computer, where the logic and usability of the user interface must meet the highest standards.

BACKGROUND OF THE INVENTION

Modern personal devices are intended for a multitude of activities and measurements: GPS navigation, heart beat rate monitoring, motion sensing, compasses, altimeters, diving computers and so on. Many devices integrate a selection of several measuring instruments into the same wristop device, trying to satisfy a multitude of needs related to health, exercise and/or outdoor activities of the user. Also, specific sports like diving is becoming technically more complex, e.g. due to more complex mixed gas diving practices and dive gear being used, and due to the continuing technical development and miniaturization of computing devices and their displays.

Another developing trend in these devices relates to their connectivity to external devices like smartphones and personal computers, and thereby also to the internet and social media. Connections to external computing power is thus extending beyond traditional data collection and reporting on a computer screen.

Examples of multi-purpose devices with communication capabilities (and needs) are presented in WO 02/067449, U.S. Pat. No. 6,556,222, GB2431522 and CH 698848. More specialized devices, e.g. diving computers, are presented in U.S. Pat. No. 5,899,204, U.S. Pat. No. 7,310,549, US2010/0250208 presenting algorithms for gas mixture and ascending time calculation, U.S. Pat. No. 5,845,235 and US2007/0283953 which shows programmable displays for diving computers, the latter making use of modern software technologies and dot matrix displays to design the diving computer display views on a PC. However, for many reasons, and especially in critical application like in diving computers, a "total freedom" for a user to re-design a user interface does not come without drawbacks and risks. First, the "look and feel" experience that has been carefully designed by the manufacturer, to let the average user get the most out of the device, may be lost. Secondly, access paths to critical data may be made too complicated, unnecessary duplicated, or totally disenabled.

BRIEF SUMMARY OF THE INVENTION

Recent developments in display technologies, application software developments and distribution as well as in providing easy intercommunication between devices, has created new opportunities for user interface creation, customization and layering. In this way complex menu and information structures can be filtered to show all relevant information in context, without losing the option for the user to easily view also other information organized under selected views. However, in critical applications like in diving computers, but also otherwise, a certain framework of allowed context boundaries, data presentation methods and colors must be maintained in order to preserve the basic usability of the device, and to make sure no security hazards are invoked by splitting up the display of critical data in the same context to different views.

It is the object of the present invention to provide an editor system for a multilayer user interface, that takes into account the recent technical developments and the need of the users to interact with and receive information from the personal device in an optimized way, allowing for personalization of the device without compromising with security and clarity of the calculated and displayed information. An inventive editor system for a personal device, like a wristop computer, is characterized by providing an editing platform for the graphical user interface of at least one predefined application having one or more display views, each of which having a set of data fields being arranged in a predetermined manner on the display view, each data field showing the value of a parameter in said user interface, wherein the inventive editor system provides user access to at least one data field of said set of data fields to allow user selection of parameters in said field, whereby a list of parameter options valid for said field is displayed for selection by the user, the parameter value of which is to be displayed in said field.

In this regard, it is to be understood that with "application" is here meant the software installed on the personal device that makes it perform its assigned tasks. In many cases, like in known dive computers, outdoor activity watches and heart rate monitors, the devices are dedicated to perform a task that cannot be altered. However, software updates and version changes may render the application to be a completely different platform compared with the one originally installed. Therefore the editor system needs to be versatile and configurable. Also modern smart devices like phones and tablets are having general-purpose integrated sensors and short-range radio communication capabilities. Useful applications can and are being designed for such devices, that previously were possible to have only in dedicated ones, as stated above. In view of recent developments it is thus to be foreseen that a single device may host several applications. Each of these applications will be subject to individual customization, which all can be done with the present inventive editor system.

A set of data fields is advantageously configured both as fields having mandatory parameter content and as fields having user-selectable parameter content. Fields having mandatory parameter content are configured to require that such mandatory parameters must be always displayed, the user can only customize the location of display in the view. In data fields having user-selectable parameter content this is not so, and the degree of possible customization is larger.

In the graphical user interface it is often desirable to have two or more alternative display modes, as different users have different preferences. Then the predetermined set of data fields is arranged in a different manner for each mode on the display view. In a preferred embodiment, the color of parameter values or symbols displayed in the data fields belongs to different and user-selectable color schemes depending on the context of the data, the contexts being neutral, timing and critical. The graphical user interface may include two or more sets of different color schemes selectable for each display mode. Again, it is important that the user may select the colors best visible ore recognizable in a particular context to him/her.

According to another preferred embodiment, the inventive graphical user interface editor system further includes connecting means providing a two-way communication between a computer system and the personal device; a user interface editor system installed on the computer for editing the graphical user interface of at least one predefined application, and data transfer means for transferring the user interface as modified on the computer by the connecting means to the personal device to be displayed as the graphical user interface for the application being installed on the personal device. Preferably the connecting means comprises an interface unit on the computer and the personal device enabling them for data exchange by means of a wireless link. Also, it is within the scope of the present invention to provide a graphical user interface editor system where the customized views of the graphical user interface that are stored in a computer system, are stored in a format that is transferable as a data file to form a graphical user interface for other similar devices.

Advantageously, the computer system provides a simulated preview of the customized views of the graphical user interface. In another embodiment, the list of parameter options displayed consists of graphically represented radio buttons in an application which forms the graphical user interface for a diving computer.

The invention also concerns a method for enabling a user to selectively display parameter data on the display of a personal device, like a wristop computer, said display having a graphical user interface for a predefined application with a set of data fields being arranged in a predetermined manner on at least one display view, the method comprising the steps of:

entering said graphical user interface into an edit mode;
selecting at least one data field opened for editing of said set of data fields;
selecting a parameter from a list of parameter options being displayed as valid options for said field;
using said data field in said display view for viewing the value of said selected parameter on said personal device.

In specific embodiments of the invention, the method includes the additional step of selecting from a selection of display views, the display view containing the desired data field to be edited, where each view has a set of data fields arranged in a predetermined manner on the display. Alternatively, the selection is made from a library of display views.

The inventive method advantageously further comprises the steps of
connecting the personal device to a computer system;
simulating on the view of the computer system the graphical user interface of the personal device,
editing the graphical user interface by modifying the content of selected data fields; and
transferring the user interface as modified on the computer system to the personal device.

According to an important embodiment of the inventive method, where the personal device is a diving computer, where the selected data field displays a user-definable diving parameter, including the steps of:
measuring or determining a value for the user-defined diving parameter;
processing the measured value, and
displaying said value of the diving parameter on the display view of the diving computer.

An important feature of the inventive method is that the computer system provides previewing of the customized views of the graphical user interface by means of simulation. The data being used for the preview simulation may be a static example stored in the memory, or data input by the user.

The inventive concept also encompasses a personal device, like a wristop computer, that includes:
detector means for measuring and determining at least one physical variable,
processor means coupled to said detector means for receiving and processing the physical variable to be displayed to the user,
display means coupled to the processor means for receiving and displaying the physical variable value,
a graphical user interface including one or more display views, each of which having a set of data fields being arranged in a predetermined manner on the display view, wherein the graphical user interface having an editing mode providing access to at least one data field of the set of data fields to allow user selection of the displayable physical variable in the field, whereby a list of variable options valid for the field is displayed for selection by the user, the variable value of which is to be displayed in the field.

It is to be understood that each display view has its own set of data fields. However, depending on the application, some data fields can or must be shared by more than one view, e.g. in the case of critical information that must be visible to the user all the time. In this regard, some data fields have mandatory physical variable content to be displayed, while others have user-selectable physical variable content.

In one embodiment of the personal device the device includes a wireless interface to a computer system in order to enable data exchange between the personal device and the computer system by means of a wireless link. The computer system may also be connected to an internet service having a user account associated with the personal device. In on alternative embodiment the editing mode for the graphical user interface of the personal device resides on the internet service, and the service includes storage of activities performed on the graphical user interface by the user of said user account. Furthermore, the management of data and parameters for said personal device can be performed on the internet service to facilitate record-keeping and sharing of activities and results of the user of the personal device between other user accounts of the service. Advantageously, a graphical user interface customized for a first personal device and stored in a computer system is transferable as a file to be used as a graphical user interface for a similar, second personal device.

In the inventive personal device two or more display modes can be displayed by the graphical user interface, where the same set of data fields is arranged in a predetermined manner which is different for each mode. Also, according to a preferred embodiment of the inventive personal device, the color of variable values or status information displayed by the display means belongs to different and user-selectable color schemes depending on the context of the data. The context can be e.g. neutral, timing and critical. Neutral can mean position information like depth, height or coordinates, or the battery charge status. Timing data may have its own color, and may include the time of the day, timing, consumed time and calculated remaining time of a dive, etc. Critical parameters may include air or gas parameters on a dive computer, or warning signals of various kinds.

It is possible for the user to select between two or more sets of different color schemes selectable for each display mode. In a personal device used as a diving computer, the detector means for measuring and determining physical variables typically includes a depth gauge and a time measuring unit, optionally tank sensors for measuring the tank pressure of a diving equipment. Also, a data field displayed by the display means may be suppressed while the diving activity is below a threshold value with regard to the diving parameter, e.g. the ascending speed of the diver may be suppressed when the diving activity is below 3 m/min.

BRIEF DESCRIPTION OF THE DRAWINGS

The various embodiments of the present invention is described in the following in detail by making reference to the attached drawings, where.

DETAILED DESCRIPTION OF EXEMPLARY EMBODIMENTS

Figure 1:
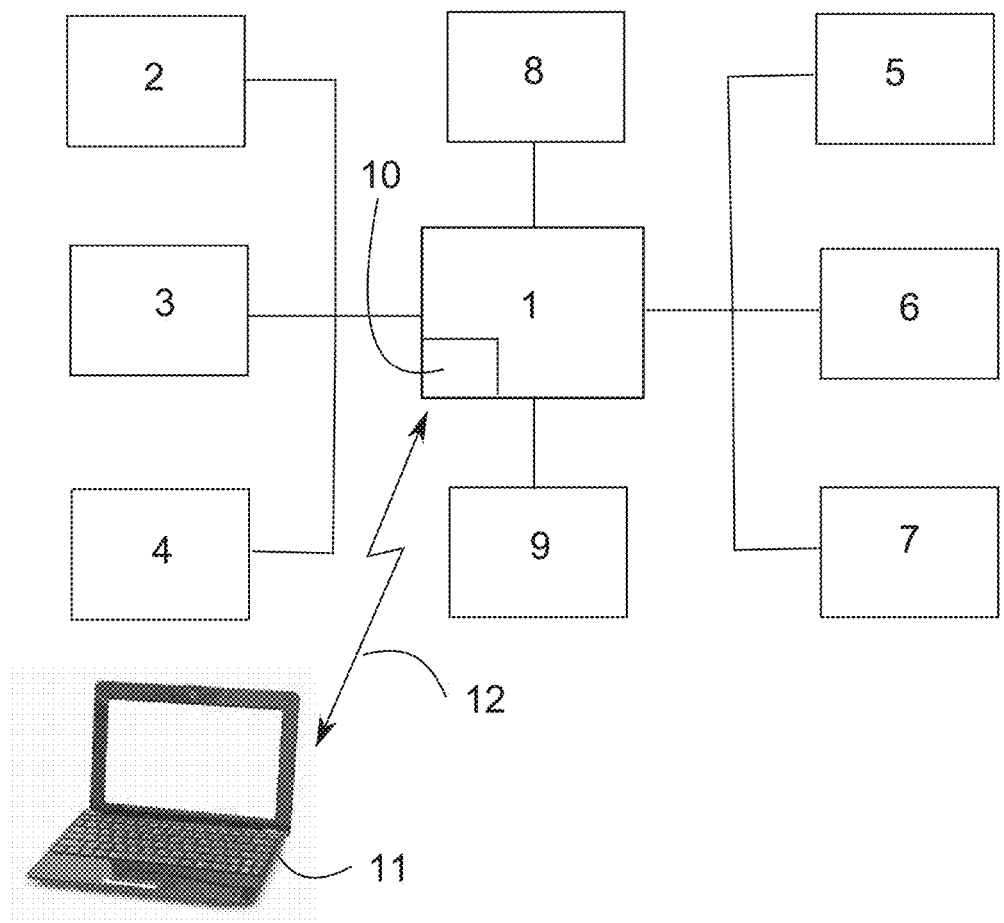
FIG. 1 shows a block diagram of a diving computer.

In FIG. 1 is shown a block diagram of a typical diving computer. The central processing unit 1 has on the left side a number of sensors, a compass 2, a depth sensor (pressure gauge) 3 and a temperature sensor 4. On the right side are the display means 5, a timing device (clock) 6 and a log memory 7 for storing the diving data and parameters. Topmost are the control buttons or knobs 8, and lowermost memory means (program memory etc.) 9. Other possible sensors or instruments (not shown) includes e.g. a water sensor, a tank pressure sensor, a heart rate monitor, an oxygen partial pressure sensor (pp02), battery charge indicator, etc. According to the present invention, the processing unit is preferably equipped with a wireless interface unit 10, which provides wireless two-way communication 12 with a computer 11, which in turn is connected to internet or other external service networks.

It is to be understood that the sensors and indicator devices used may and will vary with the purpose of the wristop computer, and in the case of a diving computer with the make and model. Also some types of dives need more parameters to be measured and shown than others, and the resources used for each dive may be a matter of customization. In the context of the present invention, no standpoint is taken as to what particular parameters and data are to be used and displayed, rather the invention concerns various aspects of how to customize and select data to be displayed on a wristop computer.

Figure 2A:
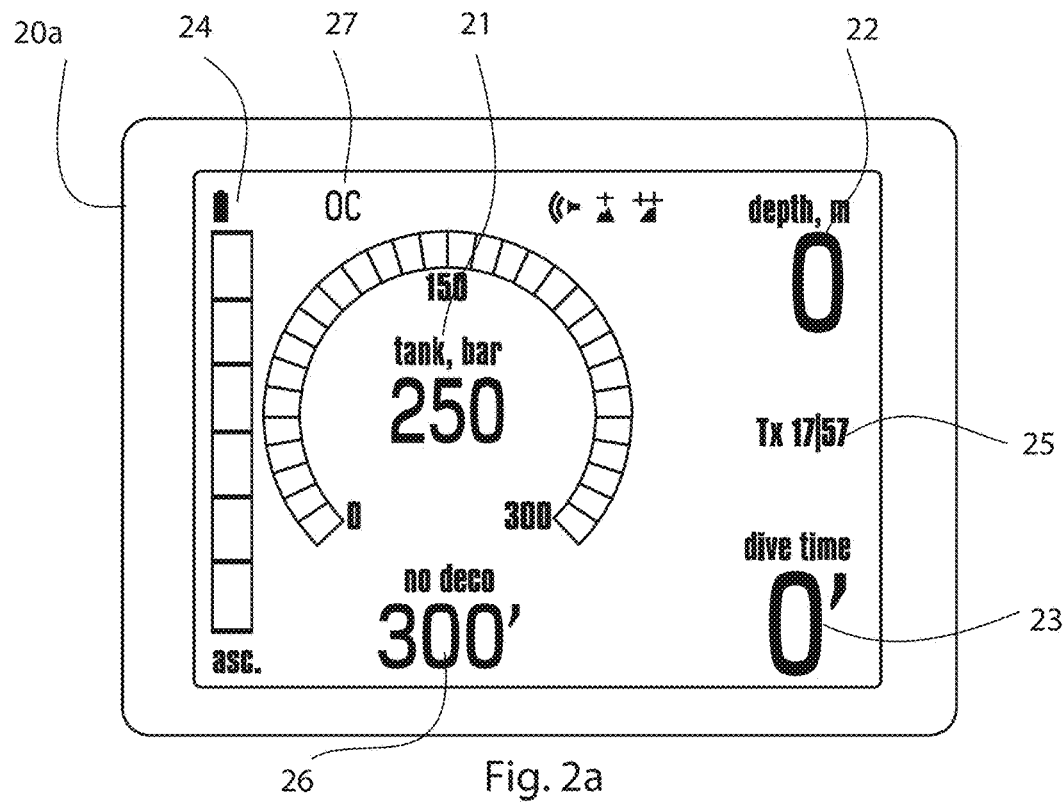
FIGS. 2a and 2b show two embodiments of the main view of a graphical user interface according to the present invention.

FIG. 2a shows an embodiment of the main view of a graphical user interface 20a according to the present invention. The use-definable modifications will be explained in detail later on. The user interface shown is one for a diving computer in a diving mode, i.e. it measures or receives information of one or several physical variables, like tank pressure 21, depth 22, dive time 23, battery charge status 24, gas mix 25 (if not air), dive time without decompression 26 (at present depth), OC/CCR 27 (Open Circuit/Closed Circuit Rebreather) indicator, etc., all depending on the capabilities of the diving computer and the customization done by the user.

Figure 2B:
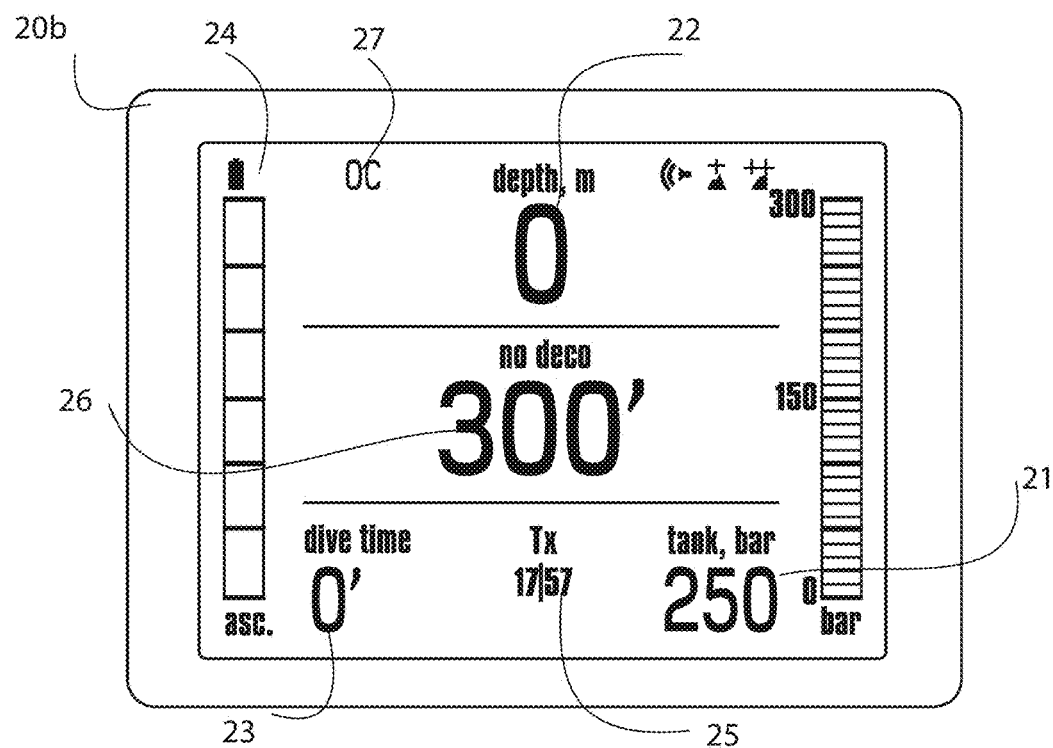

FIG. 2b shows a similar graphical user interface 20b according to the present invention, illustrating an embodiment where the graphical user interface can have different and user-selectable display modes, where the data fields are arranged in a predetermined manner different for each mode. Here, in FIG. 2b the interface is thus presenting the same fields and data as in FIG. 2a, but in a different layout on the display. As can be seen from FIGS. 2a and 2b as such and by comparing them, the variations lie in the display character or digit size, position on the view and graphical representation (digits or scale or both) of certain fields. Additionally, all parameters displayed are colored in a consistent way. Three different color schemes are being used. Depending on the context of the data to which a parameter belongs, it has a predetermined color. In FIGS. 2a and 2b the color schemes are white for neutral data like depth, battery charge status, green for timing data and blue for air or gas parameters, like tank pressure and gas mix.

In the examples shown above, which relates to a dive mode display of a diving computer, the underlying idea of the present invention becomes clear: To allow customization of the display, while retaining a scheme where no critical data is omitted, and where the user interface keep a generally similar "look and feel" as in the factory preset views. It is clear that more customization may be allowed in alternate displays not related to displaying critical safety and life-preserving data, as will be discussed later on.

It is to be understood that the invention encompasses all feasible hardware alternatives for editing and displaying the user interface on a display. The editing can, and as to some basic functions must, be done on the device itself. Alternatively and additionally, the viewing and editing of the data and parameters having a graphical user interface can be done on any computer or computer system, where a connecting means providing a two-way communication between the computer system and the personal device is established. Such connections are well known in the art, and one embodiment of the invention includes a computer system where the connecting means comprises an interface unit on the computer system and the personal device enabling them for data exchange by means of a wireless link. Transfer of settings information can be done with a PC cable or wirelessly.

In the computer or computer system, like a personal or tablet computer or, a handheld device like a smartphone, the display of the graphical user interface is simulated and displayed, on-line or off-line with respect to the inventive personal device, or wristop computer. Off-line working may or may not be preceded by a download of the present settings from the wristop computer, and usually the result is then transferred to the wristop computer at a later stage. Working online means usually that all the steps are done in a sequence during the same editing session. As the final result, the user interface as modified on the computer system is transferred by said connecting means to the inventive personal device to be displayed as the user interface on the personal device. The computer system may alternatively or in addition be connected to a user account on an internet service that is associated with the personal device. The management of the display of data and parameters for the graphical user interface of said personal device can then also be performed on the internet service. Such a service is keeping record of activities performed on the graphical user interface, e.g. acting as a storage for user interface setups and data for re-use, sharing or other activities related to e.g. social media.

Any customized display can be shared with other users of similar devices. The sharing allows for a group of people to use their personal devices in a similar way. This provides benefits for a group or a team working together, for example a crew on a sailing yacht participating in an competition event, or a group of divers planning a technical dive. Each group can customize their devices for a particular technical event or dive, and share the settings between themselves. In this way, all participants will have similar displays during the event or dive, and e.g. during a dive one can quickly check the computer displays of others and make sure everything goes as planned. This enhances diving safety and makes it easier to help each other.

By having customized displays the tailoring of the personal device for a certain use or application is made easy. At the same time, the similarity which is expected between devices being of the same make and model may be lost. However, the remedy is the aforementioned possibility to load a customized but common display to all devices participating in a dive. The rigid rules for editing the display with regard to critical dive parameters also plays an important in risk management. These will be explained later on.

As will be described in detail below, the sharing is based on a script or a runtime software file created by the editor software. The script contains the customized display settings that can be loaded into the personal device. This script or file can also be made available and loaded into similar personal devices of others. The sharing can be done via a web service or the file can simply be transferred between editors or personal devices.

Figure 3:
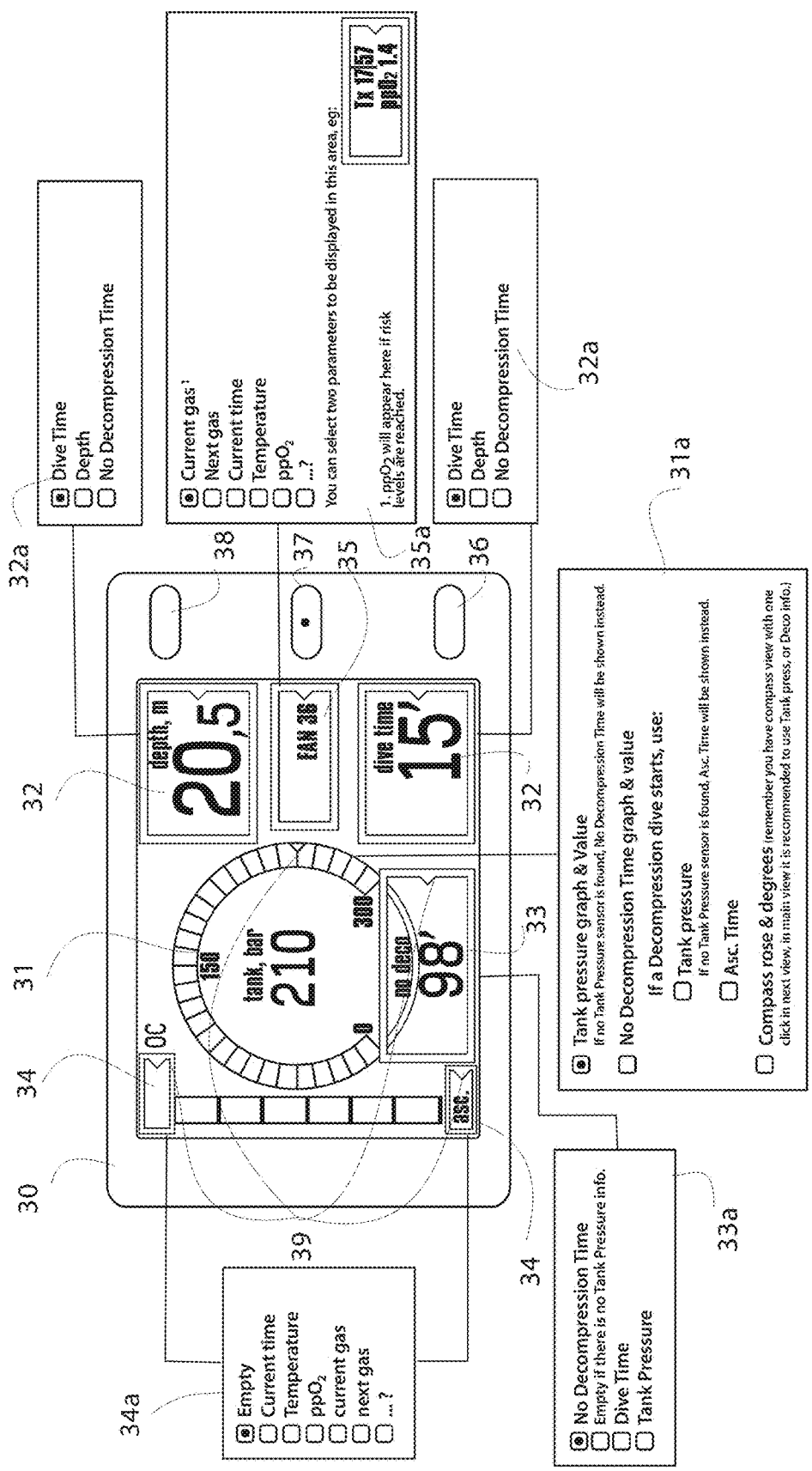
FIG. 3 shows an example of a view of the editing mode of the graphical user interface.

FIG. 3 shows the options available upon entering the editing mode of the main view of a graphical user interface 30 of FIG. 2a, as an example. The fields that can be edited are in the edit mode highlighted with a frame and marked with a small triangle 39, which when clicked on or having the cursor hovering over it, opens a selection window for each field in question. As can be seen, the fields 31-35 all have a correspondingly numbered editing mode pop-up window 31a-35a. All editing follows the same logic: all fields are arranged in a predetermined manner on the display view. This means they content may be configurable by editing, but their location on the view and the editing options they offer cannot. The list of options presented in pop-up windows 31a-35a contain only the valid options for each field, and is displayed for selection only when editing that particular field. Some of the fields may have identical content options, like fields 34 and fields 32, which share the respective same editing mode windows 34a and 32a. The system does however not allow duplication of information on the view, so when a user by mistake tries to have the same information displayed by two or more fields, the duplicated information will be highlighted to the user with the parameters suggested for that field to be replaced with.

According to an embodiment of the invention, the list of options displayed in the editing mode pop-up windows 31a-35a consists of graphically represented radio buttons. The radio buttons are arranged in a column of two or more options and are displayed on the view as, in this example, a list of rectangular white spaces for unselected options, having a dot when it is selected. Each radio button is accompanied by a label describing the choice that the radio button represents, like Dive Time, Depth, No Decompression Time, etc. According to the logic principle of radio buttons, when the user selects a radio button, any previously selected radio button in the same window usually becomes deselected. Selecting a radio button is done by clicking on the button itself with the mouse. It is clear that different devices used for customization will have different user interfaces (e.g. touch screens etc.) and thus offer different possibilities for selection purposes. Visualization, like scrolling through available options within the field by swapping the content inside it, is commonplace.

Some labels may also contain explanative language. For example, in window 31a there are explanations for alternatives when selecting certain information in case that option is not available at some point of the activity. These alternatives are partly dictated by the fact that not all diving equipment includes all same components, for example a tank pressure sensor. Depending on the kind of dive, risks, or needs in certain circumstances, the system must make sure the critical limits of dive calculated and monitored by timing and depth parameters are always clearly displayed. Here, if no tank pressure sensor is found, and a dive requiring decompression is to be performed, the ascending time will be shown as a graph in field 31.

Likewise, some fields may have more than one parameter that can be shown, like in field 35a, which allow for multiple choices of two different parameters. This is an exception to the basic logic for radio buttons that can be easily implemented by software, but was difficult and unnecessary to implement in a mechanical radio button construction.

Also shown in FIG. 3 are the three operating buttons 36, 37 and 38 of the device, including the "menu" button 37. A short press on the button is used to scroll through the available displays. A long press enters the menu functionality. When not diving, all the menu functions and settings are available. During a dive, a limited set of functions are available, and a long press is used to open the gases menu (as well as before/after a dive through the menu list). The location of the button makes it easy to remember and also safe: a long press triggers the gas menu, while a short press toggles between information displays.

Higher 38 and lower 36 (up & down) buttons are used for scrolling and changing selection, and in some views, for making bookmarks, using timers as well as for feature shortcuts.

Generally, the editing process follows a set of rules and checks, which will be explained below. From a user point of view, the editor software have a checklist of mandatory data, which means that some parameters in the selectable parameter set(s) are specified as mandatory, so the user may select the place for them, but may not omit them from the view. During the editing process, the editor software checks at some suitable point, for example before saving the customized view, that all mandatory parameters are present. If not, the editor software will prompt for missing mandatory data to be put in one of the indicated fields, before saving.

The editor software may include an option for a display simulation or preview. With the preview the user can try out what the display will show in different situations without actually undertake the planned event. This gives feedback to the user and alleviates concerns of having an unusable display. The preview or simulation mode can present the various displays and views as a sequence of snapshots, or as an animated fast run-through of the event.

Figure 4:
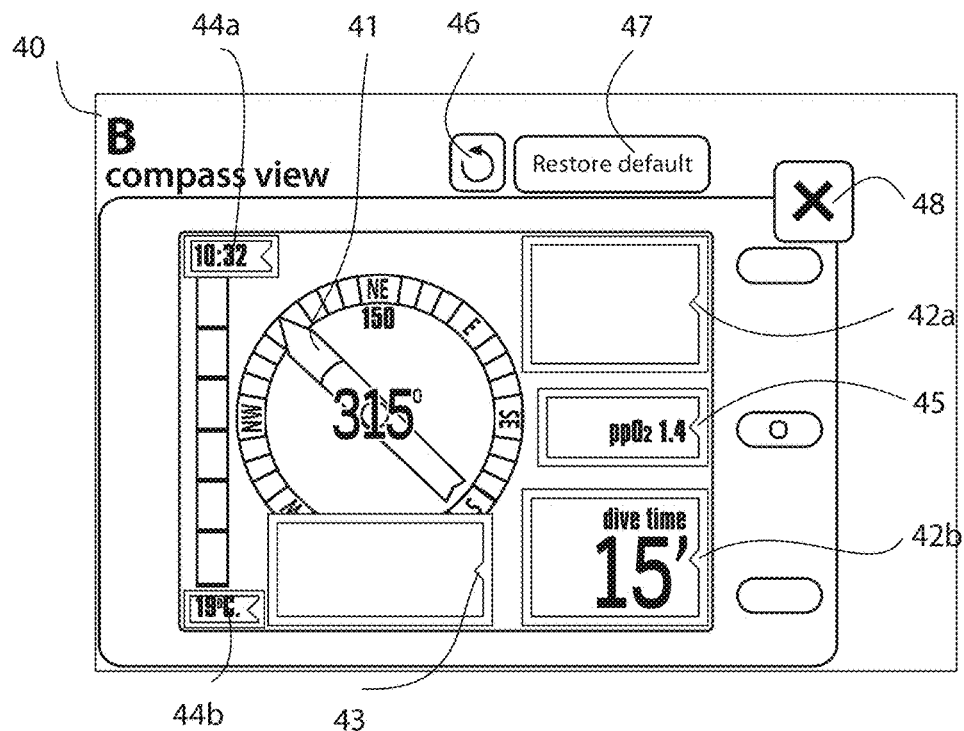
FIG. 4 shows a secondary view to be used with the inventive graphical user interface, FIG. 5. shows another secondary view to be used with the inventive graphical user interface.
Figure 5:
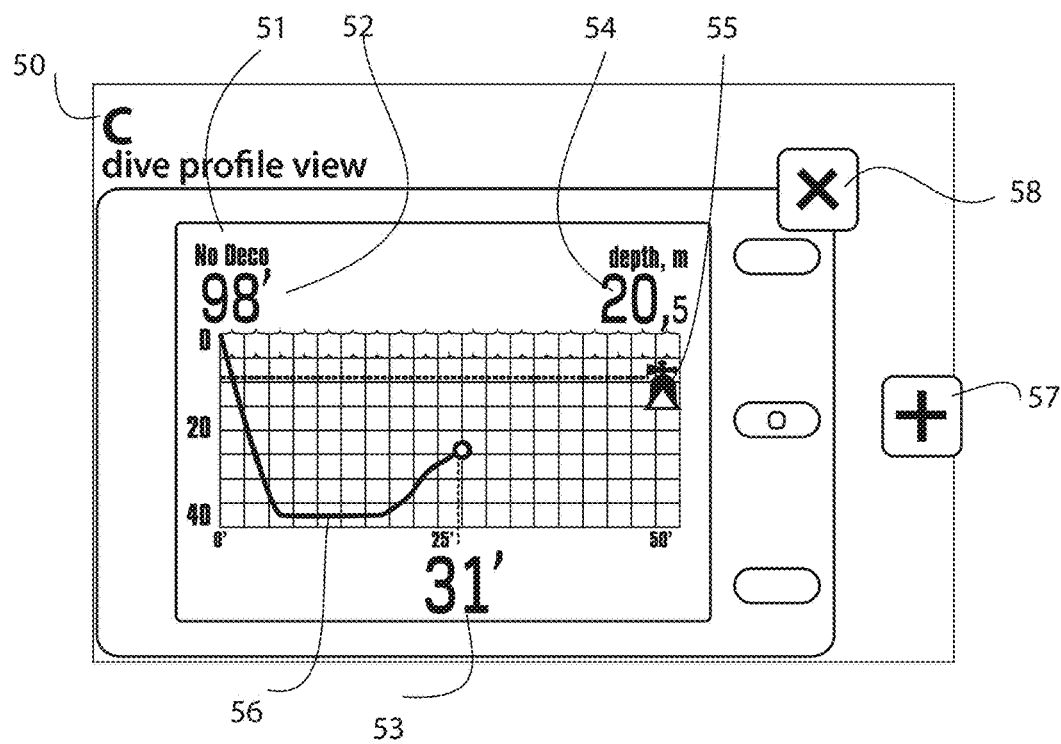

Referring now to FIGS. 4 and 5, they show secondary views to be used with the same inventive graphical user interface. The main view as shown in FIGS. 2a and 2b above can be completed with more or less customizable views. Any view must be belong to a defined view type, in order for the system to know what rules to apply to each view. Such types includes an info view, like the one shown in FIG. 4, where the basic layout with some compulsory elements is taken from the main view, but with a different main visual element on the view, here a compass. Another type is a dive profile view, as shown in FIG. 5. A third type may be a "gallery view", making it possible to browse through downloaded files of interest during the dive (e.g. pictures of species of fish).

As shown by the cross 48 and 58 in FIGS. 4 and 5, and the plus sign 57 shown in FIG. 5, secondary views can easily be added or removed from the user interface. Obviously, the main view, or the dive view as shown in FIGS. 2 and 3 cannot be removed. Typical editing features include also the "undo" button 46 and the "restore default" button 47 as shown in FIG. 4.

The additional displays also have a set of data fields arranged in a predetermined manner on the display, although the rules may be more flexible. In FIG. 4, the view 40 is denoted "B compass view", as the central field 41 is reserved for a graphical representation of a compass and its needle. Other customizable fields are time and temperature 44a and 44b, No Decompression Time 43, depth and dive time 42a and 42b, and the set point or actual oxygen partial pressure 45. Some of the critical fields may be superimposed on subsequent views, in any case, or depending on the planned dive, or because of issues and circumstances during the dive.

FIG. 5 shows a further additional display 50 showing on a single large filed 51 a graphical representation 56 of the dive profile, i.e. the depth 54 as a function of time 53. Also here, the critical parameter No Decompression Time 52 is displayed, in order to keep the diver informed about critical parameters all the time.

Preferably, throughout all displays, three different color schemes are used, for each context of the diving data. The contexts, each having a different color, are neutral (not critical diving data), timing and air/gas. There can be two or more sets of selectable color schemes, according to the preferences of the user. Also the display of some diving data parameters may be suppressed, if the diving activity is below a threshold value. This makes the display less crowded. Obviously, the diving parameter will re-appear on the display in its selected field, if the threshold is crossed. An example of such a parameter is the ascending speed of the diver that can be suppressed if the diving depth changes for more than a predetermined time period is below 3 m/min.

Figure 6:
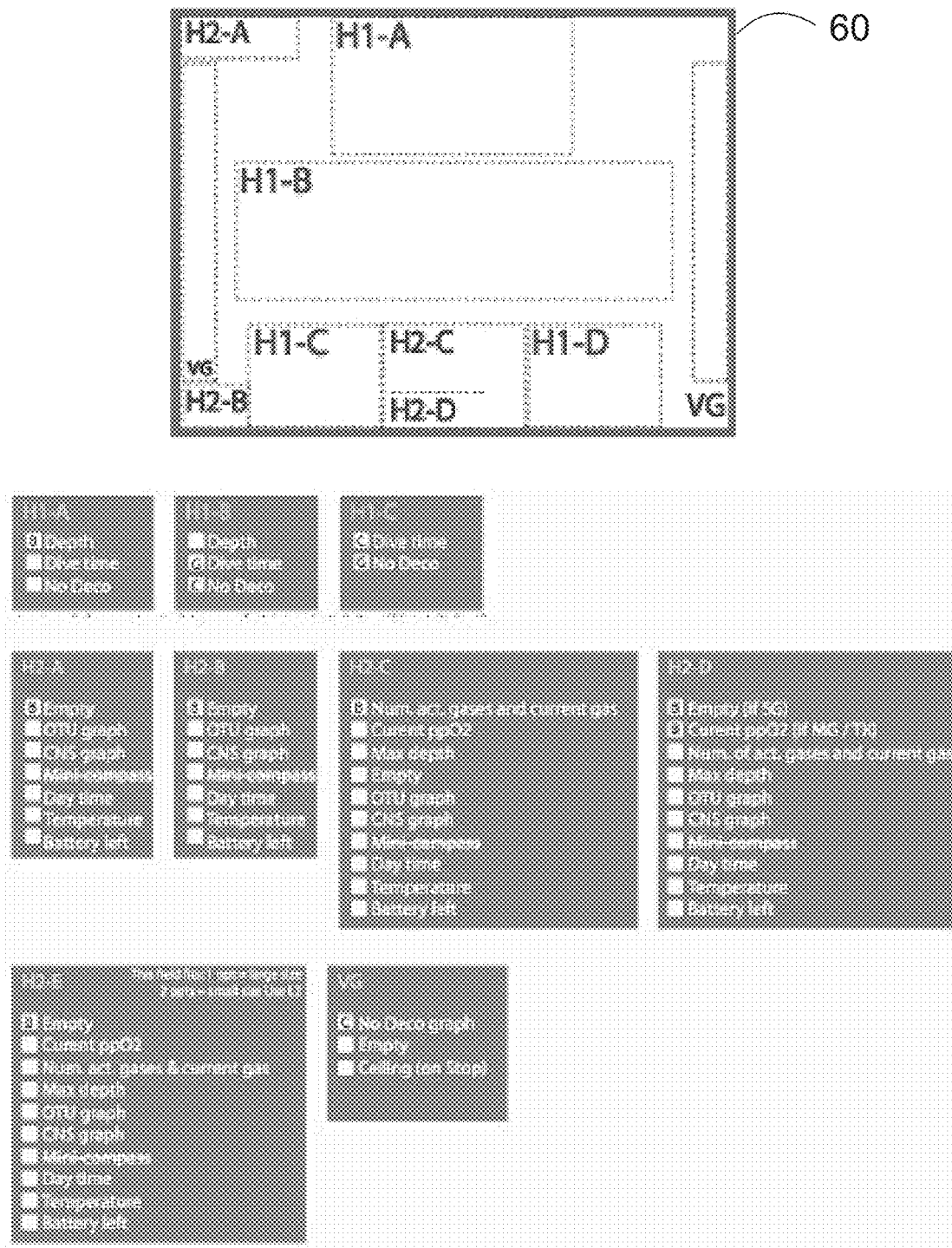
FIG. 6 shows an example of the hierarchy of the editing mode in a view.
Figure 7:
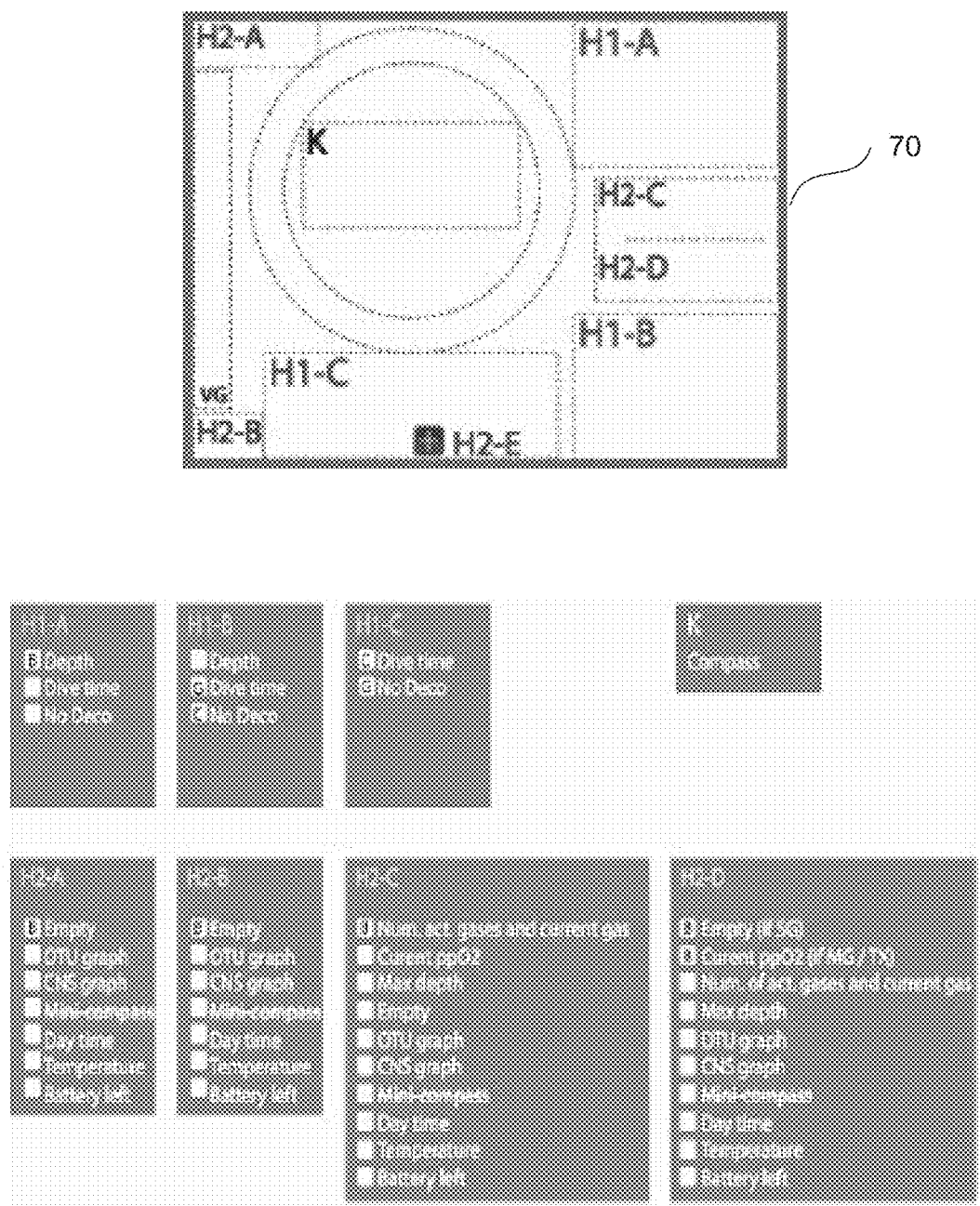
FIG. 7 shows an example of the hierarchy in another view.

FIG. 6 and FIG. 7 illustrates further the editing process in a dive computer as described in connection with FIG. 3. FIG. 6 shows an embodiment of a graphical user interface 60 similar to the one shown in FIG. 2b, and FIG. 7 a graphical user interface 70 similar to the one shown in FIG. 4 ("compass view"). The basic logic in the customization process is that fields with the highest hierarchy info H1 will contain critical data in the same place of the interface for easy & quick localization. The content options for H1 fields are few, as can be seen from the short lists for the fields H1-A, H1-B and H1-C. The second hierarchy fields H2 will be customizable to a greater extent, allowing more options in different views for best use with specific needs, see the list of alternatives for the fields H2-A-H2-E in FIG. 6 and H2-A-H2-D in FIG. 7, respectively.

When an information field is changed with an already existing parameter, the duplicated info field will highlight. If there is any missing H1 information, a notice of what is missing will appear. If there is anything highlighted or anything missing, the customization cannot be synchronized with the device and an error message saying the configuration cannot be saved is given to the user. Other fields shown are K (compass) and VG (Vertical Graph, e.g. an analog-style bar indicator). The alternative options listed in FIGS. 6 and 7 are non-exhaustive, and are shown as examples only. They do however clearly demonstrate the logic and hierarchy of the inventive editing system, and complete the picture lined out in connection with FIG. 3.

Customization is also affected by some general dive characteristics, like if tank pressure is shown or not, if it is a no decompression or a decompression dive, any planned decompression stops, also ascending or descending directions have different critical data. Different dive modes include scuba, gauge, Technical dive (with gas mix) and CCR (Closed Circuit Rebreather). Different views may be attached to different dive modes: a user might need an extra dive view for scuba related info that is not needed during a gauge mode dive. Thus the intended dive depth and duration, critical information related to the planned dive mode, and the available sensors in the equipment will all affect the number of H1 fields available on a particular view.

The editing process start with selecting the desired style, here Graphical (FIG. 2a) or Classic (FIG. 2b). All relevant information in the H1 fields will be in the same place independent of the style.

Some additional explanatory and non-exhaustive rules relating to the behavior of the editing system is listed below:
  the customization of one H1 field will affect available options in other H1 fields;
  depth must be in one of the two largest fields;
  "surplus" or any H2 information fields, like a "No Deco" time indication, may during a dive that turns to a decompression dive, be overruled and used for other time related or critical H1 information, like a stop duration timer or time to surface (TTS) indication;
  H12 or secondary information fields can have different information in different styles;
  a compass (graphical rose) can only be added in the "compass view" (FIG. 6, field K).

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A personal device comprising:
   a graphical user interface editor system for editing the graphical user interface of at least one predefined application having one or more display views, each of which having a set of data fields being arranged in a predetermined manner on the display view, each data field showing the value of a parameter in the user interface,
   wherein the editor system includes connecting means providing a two-way communication between a computer system and the personal device; said user interface editor system being installed on the computer system,
   wherein the editor system provide user access to at least one data field of the set of data fields to allow user selection of parameters in the field,
   whereby a list of parameter options valid for the field is displayed for selection by the user, the parameter value of which is to be displayed in the field,
   wherein the graphical user interface includes two or more alternative display modes where the predetermined set of data fields is arranged in a different manner for each mode on the display view,
   wherein the graphical user interface includes two or more sets of different color schemes selectable for each display mode, and
   wherein the editor system further comprises data transfer means for transferring the user interface as modified on the computer by said connecting means to the personal device to be displayed as the graphical user interface for the application on the personal device.

2. The personal device graphical user interface editor system according to claim 1, wherein the computer system by simulating an event provides a preview of the customized views of the graphical user interface stored in the computer system.

3. The personal device graphical user interface editor system according to claim 1, wherein the customized views of the graphical user interface that are stored in the computer system are stored in a format that is transferable as a data file to form a graphical user interface for other similar devices.

4. The personal device graphical user interface editor system according to claim 1, wherein the connecting means comprises an interface unit on the computer and the personal device enabling them for data exchange by means of a wireless link.

5. A diving computer comprising:
   a graphical user interface editor system for editing the graphical user interface of the diving computer having one or more display views, each of which having a set of data fields being arranged in a predetermined manner on the display view, each data field showing the value of a user-definable diving parameter in the user interface,
   wherein the editor system provides user access to at least one data field of the set of data fields to allow user selection of user-definable diving parameters in the field,
   whereby a list of parameter options valid for the field is displayed for selection by the user, the parameter value of which is to be displayed in the field,
   wherein the graphical user interface includes two or more alternative display modes where the predetermined set of data fields is arranged in a different manner for each mode on the display view, and
   whereby the value for the user-defined diving parameter which is measured and processed by the diving computer is viewed in said field in a display view on the display of the diving computer.

6. A method for enabling a user to selectively display and edit parameter data on a display of a diving computer, the display having a graphical user interface for a predefined application with a set of data fields being arranged in a predetermined manner on at least first and second display views, the method comprising the steps of:
   entering the graphical user interface into an edit mode;
   sequentially selecting at least first and second separate data fields of the set of data fields for editing on the first display view;
   selecting first and second user-definable diving parameters from a list of parameter options being displayed as valid options for the first and second separate fields of the first display view, respectively;
   measuring or determining a value for the user-defined diving parameter and processing the measured value, and
   using the first and second data fields for viewing first and second values of the first and second selected user-definable diving parameters in the first display view on the display of the diving computer.

7. A method for enabling a user to selectively display and edit parameter data on a display of a personal device, the display having a graphical user interface for a predefined application with a set of data fields being arranged in a predetermined manner on at least first and second display views, the method comprising the steps of:
   connecting the personal device to a computer system;
   simulating on the view of the computer system the graphical user interface of the personal device;
   entering the graphical user interface into an edit mode;
   sequentially selecting at least first and second separate data fields of the set of data fields for editing on the first display view;
   editing the graphical user interface by modifying the content of the selected data fields by selecting first and second parameters from a list of parameter options being displayed as valid options for the first and second separate fields of the first display view, respectively;

transferring the user interface as modified on said computer system to the personal device, and using the first and second data fields in the first display view for viewing first and second values of the first and second selected parameters on the personal device.

8. The method for enabling a user to selectively display and edit parameter data on the display of a personal device according to claim 7, wherein the computer system provides the additional step of previewing the customized views of the graphical user interface stored in the computer system by means of an event simulation.

9. A personal device including:

detector means for measuring and determining at least one physical variable, processor means coupled to the detector means for receiving and processing the physical variable to be displayed to the user, display means coupled to said processor means for receiving and displaying the physical variable value, a graphical user interface including one or more display views, each of which having a set of data fields being arranged in a predetermined manner on the display view, and a wireless interface to a computer system in order to enable data exchange between the personal device and the computer system by means of a wireless link, wherein the graphical user interface having an editing mode providing access to at least one data field of the set of data fields to allow user selection of the displayable physical variable in the field, whereby a list of variable options valid for the field is displayed for selection by the user, the variable value of which is to be displayed in the field, wherein on the display means two or more display modes can be displayed by the graphical user interface, where the predetermined set of data fields is arranged in a predetermined manner different for each mode, and wherein the graphical user interlace includes two or more sets of different color schemes selectable for each display mode.

10. A personal device according to claim 9, wherein the computer system is connected to an internet service having a user account associated with the personal device.

* * * * *